US005136329A

United States Patent [19]

Sugiura

[11] Patent Number: 5,136,329

[45] Date of Patent: Aug. 4, 1992

[54] IMAGE FORMING APPARATUS CAPABLE OF UTILIZING EXCESS HEAT

[75] Inventor: Yoshinori Sugiura, Kawasaki, Japan

[73] Assignee: Canon Kabushiki Kaisha, Tokyo, Japan

[21] Appl. No.: 630,045

[22] Filed: Dec. 19, 1990

[30] Foreign Application Priority Data

Dec. 21, 1989 [JP] Japan .................................... 1-14849
Dec. 29, 1989 [JP] Japan ............................ 1-343109[U]

[51] Int. Cl.[5] .......................... G03G 15/00; H02B 1/00

[52] U.S. Cl. ....................................... 355/30; 355/200; 355/215; 361/388; 361/383

[58] Field of Search ............... 361/389, 386, 388, 394, 361/395, 383, 384; 357/81, 80; 355/200, 215, 30

[56] References Cited

U.S. PATENT DOCUMENTS 3,848,988 11/1974 Thettu et al. ....................... 355/200
4,118,178 10/1978 Calvi et al. ..................... 355/206 X
4,351,005 9/1982 Imai et al. ......................... 357/81 X
5,001,516 3/1991 Maruyama et al. ................. 361/394
5,051,866 9/1991 Osaka ................................. 361/388

*Primary Examiner*—A. T. Grimley
*Assistant Examiner*—Nestor R. Ramirez
*Attorney, Agent, or Firm*—Fitzpatrick, Cella, Harper & Scinto

[57] ABSTRACT

The present invention is directed to increase the radiating effect for the heat generated by an electric circuit portion disposed in an image forming apparatus, and radiates the heat by passing a recording sheet fed from a recording sheet containing portion through a recording sheet guiding portion disposed near an electric circuit portion for the image forming apparatus. The guiding portion has radiating ability for radiating the heat generated by the electric circuit portion through which the recording sheet passes. Not only by a radiating means such as a fan, but also by the moving recording sheet itself or by the air stream generated by the movement of the recording sheet, the heat is removed, thus improving the radiating effect.

22 Claims, 9 Drawing Sheets

IMAGE FORMING APPARATUS CAPABLE OF UTILIZING EXCESS HEAT

BACKGROUND OF THE INVENTION

1. Field of the Invention

The present invention relates to an image forming apparatus such as an electrophotographic apparatus wherein a light source is modulated in accordance with an image signal, a latent image is formed on an electrophotographic photosensitive drum, the latent image is developed with toner by using an electrophotographic process and a toner image is transferred onto a recording sheet such as a transfer paper, and an ink jet recording apparatus wherein ink droplets are discharged onto a recording sheet in accordance with an image signal to form an image. More particularly, the present invention relates to a technique that copes with the heating of electric parts such as electric circuits disposed in such an image forming apparatus.

2. Related Background Art

FIG. 4 shows an example of a conventional image forming apparatus, and FIG. 5 shows a perspective view of such image forming apparatus.

In the past, electric parts such as an electric power source and the like used with an image forming apparatus were large-sized and had poor energy efficiency. Thus, the electric parts inevitably generated a large amount of calorific value. Recently, although the electric parts were improved, became small-sized and had relatively high efficiency in comparison with the old electric parts, the electric parts 110 such as an electric power source and motors still generated a considerable calorific value.

As a further improvement in order to radiate the heat generated by the electric part more effectively, the electric part 110 was disposed at an area near an armor having good permeability, such as a position designated by 110 in FIGS. 4 and 5.

Incidentally, FIGS. 4 and 5 show a laser beam printer applied to an electrophotographic process, and the reference numeral 111 denotes a corona discharger for transferring a toner image formed on a photosensitive member 9 onto a transfer sheet 3, and 112 denotes an ejecting opening for ejecting the transfer paper 3 passed through a fixing station.

However, if the electric part must be disposed near the armor, the compactness of the image forming apparatus itself is inevitably limited. Further, since there must be provided a radiating means such as a cooling fan and/or specific radiating (heat discharging) openings formed in the armor, the cost of the apparatus is increased.

Accordingly, it has been required to average the electric part at a position where the heat is effectively radiated, in consideration of the freedom of the installing position for the electric part.

SUMMARY OF THE INVENTION

An object of the present invention is to effectively eliminate the heat generated by an electric part in an image forming apparatus.

Another object of the present invention is to permit the installation of an electric part at any positions which are not limited to a wall of a body of an image forming apparatus.

Another object of the present invention is to cope with the heat generated by an electric part and to stabilize the image formation.

In order to achieve the above objects, an image forming apparatus according to the present invention comprises a recording sheet containing portion for containing recording sheets, an image forming portion for forming an image on the recording sheet, a recording sheet conveying means for supplying the recording sheet to the image forming portion, and a recording sheet guiding portion disposed near an electric circuit portion regarding the image forming apparatus and having radiating ability for radiating the heat generated by the electric circuit portion through which the recording sheet passes.

The image forming portion is applicable to a printer or copying machine using an electrophotographic photosensitive member, or to an ink jet printer. The recording sheet may be a sheet-like paper or be a continuous sheet such as fan-fold paper or a roll paper.

The radiating portion may be used as the guiding portion, or be disposed near the recording sheets contained in the containing portion in non-contacting relation thereto.

DETAILED DESCRIPTION OF THE PREFERRED EMBODIMENTS

In embodiments of the present invention which will be explained hereinafter, an electric power source portion (including a transformer, transistors and the like) which is one of various electric parts will be described as an example of the electric part.

Figure 1:
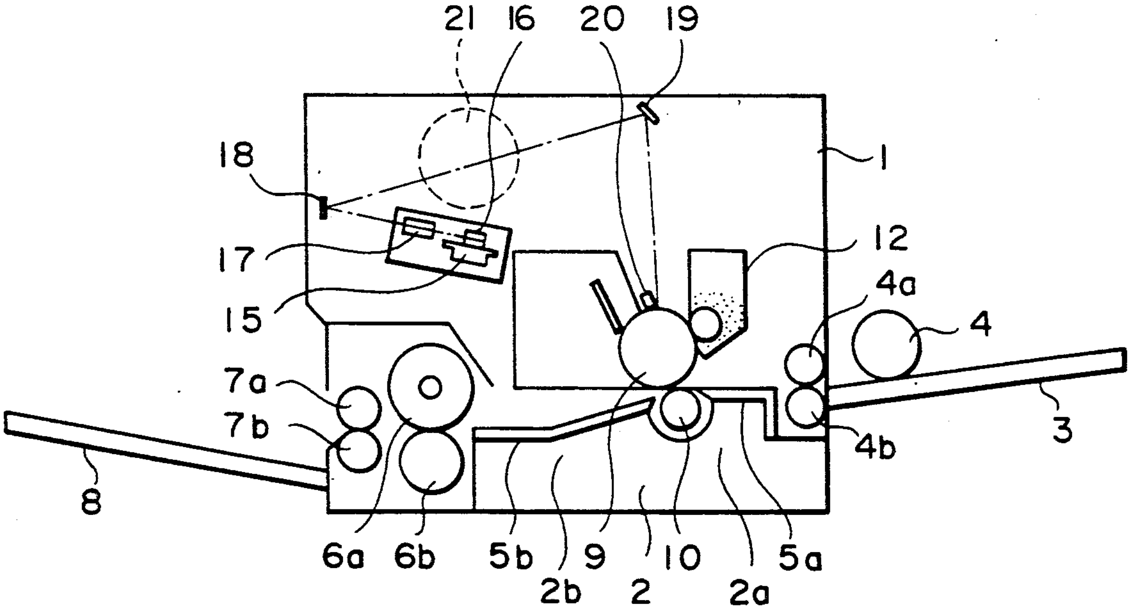
FIG. 1 is an elevational sectional view of an image forming apparatus according to a preferred embodiment of the present invention.

FIG. 1 shows a sectional view of an image forming apparatus according to the present invention which is embodied as a laser beam printer using an electrophotographic process.

In FIG. 1, the reference numeral 1 denotes an armor of an image forming apparatus; and 2 denotes the electric power source portion. A bundle of laser beams emitted from a laser beam source (not shown) is changed to a scanning luminous flux by a polygonal mirror 16 rotatingly driven by a polygon motor 15, and is passed through an $f\theta$ lens 17. Then, the luminous flux is reflected by reflection mirrors 18, 19 to be directed to an electrophotographic photosensitive member (drum)

9 uniformly charged by means of a charger 20. An electrostatic latent image so formed on the photosensitive drum 9 is visualized (as a toner image) by a toner developing device 12.

On the other hand, a recording sheet such as a paper picked up one by one by means of a supply roller 4 from a sheet supply cassette 3 constituting a containing portion is pinched by a pair of regist rollers 4a, 4b driven by a driving motor 21 (shown by a broken line circle) and is temporally stopped. The pair of regist rollers 4a, 4b are started to rotate synchronously with or in a predetermined time-delayed relation with the timing that optical information is recorded on the photosensitive drum 9 in response to the image signal, so that the recording sheet is fed to register a leading end of the recording sheet with a leading end of the image in a transferring position.

In this way, the recording sheet is moved on a feeding guide 5a and is sent to the transferring position between the photosensitive drum 9 and a transfer roller (transferring means constituting a transfer electrode) 10. The recording sheet on which the toner image was transferred is moved on a feeding guide 5b which is planar or is provided with a fin-shaped irregular surface extending in a sheet moving direction similar to that shown in FIG. 8, and then is sent to a pair of fixing rollers 6a, 6b. The toner image is fixed onto the recording sheet by means of the fixing rollers 6a, 6b with heat and pressure, and then, the recording sheet is ejected onto an ejector tray 8 by means of a pair of ejector rollers 7a, 7b.

In the illustrated embodiment, the electric power source portion 2 for supplying the electric power to various means in the image forming apparatus is removably mounted within the image forming apparatus so that it can be removed from the bottom of the apparatus. Further, all of walls surrounding the electric power source portion 2 are constituted by metal plate members each of which has a radiating ability itself.

Figure 4:
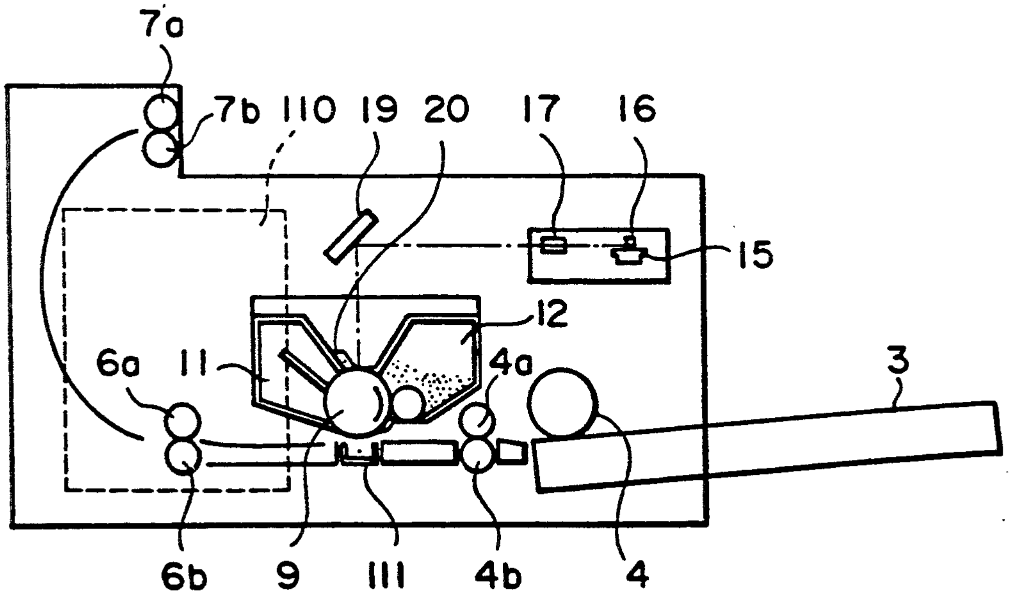
FIG.4 PRIOR ART
FIG. 4 is an elevational sectional view of a conventional image forming apparatus.
Figure 5:
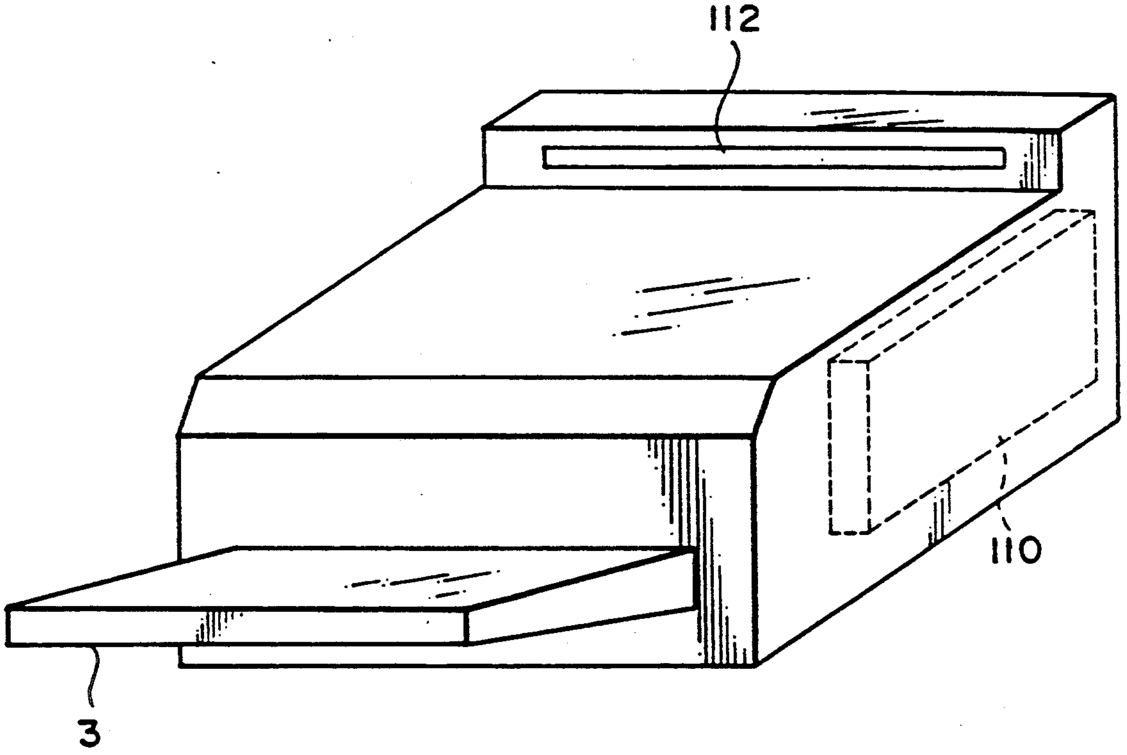
FIG. 5 PRIOR ART
FIG. 5 is a perspective view of the image forming apparatus of FIG. 4.

As shown in FIG. 1, since the electric power source portion 2 is arranged at a side opposite to a side where the photosensitive drum 9 is disposed with respect to the feeding guides 5a, 5b (forming a recording sheet feeding path), the availability of the space within the armor 1 of the image forming apparatus is improved in comparison with the apparatus shown in FIG. 4, thus permitting the compactness of the apparatus.

Figure 2:
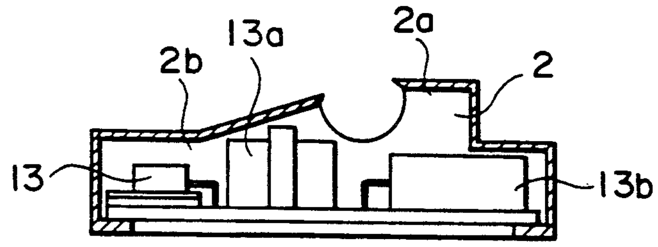
FIGS. 2 and 3 are elevational sectional views showing electric power source portions according to respective embodiments.

FIG. 2 shows an electric power source portion devised or improved to reduce the influence of the heat generated by the electric power source portion upon an electrophotographic process portion.

The electric power source portion 2 comprises a section 2a into which a power circuit having a relatively small calorific value is incorporated, and a section 2b into which a power circuit having a relatively large calorific value is incorporated. For example, a capacitor 13b of a switching power source, a high frequency oscillating circuit and the like are arranged in the section 2a, and a transistor 13a, a power transistor 13, secondary rectifier diode and the like which have the large calorific values are arranged in the section 2b. The reason is that, since the process portion for the image formation (of the electrophotographic apparatus) is disposed above the section 2a of the electric power source portion, and accordingly, the developing device 12 and a toner hopper which are particularly sensitive to the change in temperature are also disposed above the section 2a, if these elements are arranged above the section 2b, the charging ability and/or fluidity of the toner are easily changed to make the developing feature uneven. Further, particularly, if the toner hopper is heated, the toner is softened, with the result that the fluidity of the toner in the hopper is worsened, thus causing the poor development.

A cleaning device 11 is arranged above the section 2b. The cleaning device 11 is insensitive to the change in temperature and is not influenced by the poor fluidity of the softened toner due to the temperature increase.

An upper portion of an outer wall surrounding the electric power source portion 2 is made of a metallic shield and aluminium material having good heat transfer feature, and is contacted with the feeding guide 5b formed independently of the outer wall. The feeding guide 5b is formed from a radiating member (metallic member) and thus has a radiating ability. Consequently, when the recording sheet is moved on the feeding guide 5b while contacting therewith, the heat transferred from the electric power source portion 2 to the feeding guide 5b is absorbed by the recording sheet moving on the guide.

In this way, the heat generated by the power source is transferred to the feeding guide via the outer wall, and a part of the heat is discharged within the armor of the image forming apparatus and a part of the heat is absorbed by the recording sheet. Thus, the recording sheet and the feeding guide substantially act as cooling means for the electric power source portion.

Figure 3:
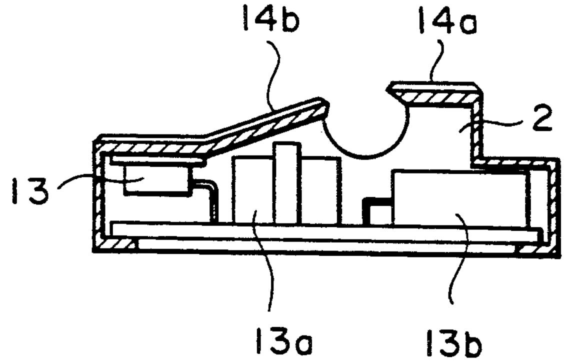

FIG. 3 shows an electric power source portion 2 including recording sheet feeding guides 14a, 14b formed integrally therewith. An upper portion of an outer wall of the electric power source portion 2 is constituted by the feeding guides 14a, 14b each having radiating fins and formed from an integral aluminium die-casting. An edge line of each radiating fin has a certain curvature to form the feeding guides 14a, 14b for the recording sheet. A cooling method is the same as that in the previous embodiment (FIG. 2); however, in this case, since the feeding guides 14a, 14b are formed integrally with the electric power source portion 2, the radiating effect for the electric power source 2 is more improved. In order to further improve the radiating effect, the power transistor 13 having the large calorific value is directly attached to a back surface of the feeding guide 14b.

By the way, it is not necessary that the electric power source portion is arranged at the side opposite to the photosensitive drum with respect to the feeding guides; but, the electric power source portion may be arranged at any position where the feeding guide can be utilized as a radiating member for the electric power source portion. For example, the electric power source portion may be arranged near the feeding guide for guiding the recording sheet passed through the fixing device. Further, while the electric power source portion was explained as an example of the electric part, other electric parts such as a driving motor and the like may have the same construction.

As mentioned above, according to the illustrated embodiments, since the feeding guide for guiding the recording sheet can be utilized as the radiating member for the electric part, a special cooling fan for radiating the heat generated by the electric part such as the electric power source portion and the like is not needed, thus improving the freedom of installation of the electric part, with the result that it is possible to make the image forming apparatus itself more compact.

Further, since the recording sheet is heated by absorbing the heat from the electric part, less thermal energy is required for heating the recording sheet by means of the fixing device. In addition, since the cooling fan can either be small-sized or be omitted, the image forming apparatus itself becomes inexpensive.

Figure 6:
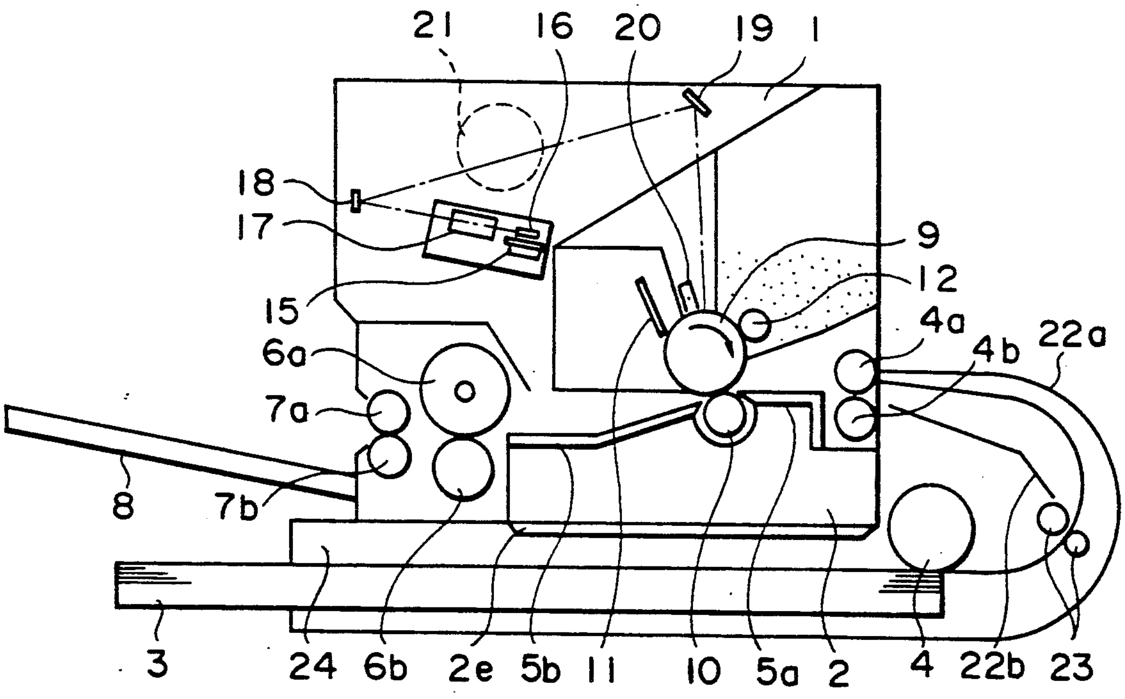
FIG. 6 is a sectional view of the image forming apparatus showing an example that the heat is radiated at both sides of an electric part.

Next, a further embodiment of the present invention shown in FIG. 6 will be explained. This embodiment has the construction of the feeding guides according to the above-mentioned embodiments and also has an ability for pre-heating the stacked recording sheets.

In this embodiment, an electric power source portion 2 is removably mounted within the image forming apparatus so that it can be removed from the bottom of the apparatus. Walls surrounding the electric power source portion are constituted by metallic members each of which has a radiating ability. Particularly, a radiating plate 2e with radiating fins is arranged at the bottom of the electric power source portion. Further, a sheet supply unit 24 is removably mounted within the image forming apparatus in confronting relation to the radiating plate 2e.

The sheet supply unit 24 comprises a recording sheet stack 3, a pick-up roller 4, a pair of conveying rollers 23, feeding guides 22a, 22b and a frame (not shown).

Next, the operation of the sheet supply unit will be explained.

An uppermost recording sheet in the sheet stack 3 is picked up by the pick-up roller 4 and is sent to the paired conveying rollers 23. The recording sheet is further conveyed by the paired conveying rollers 23 to the paired regist rollers 4a, 4b through the feeding guides 22a, 22b, where the recording sheet is pinched by the regist rollers and is stopped there. The pair of regist rollers 4a, 4b are started to rotate synchronously with or in a predetermined time-delayed relation with the timing that the optical information is recorded on the photosensitive member 9 contained in the process portion in response to the image signal. By the rotation of the regist rollers 4a, 4b, the recording sheet is sent to the photosensitve member 9.

During the image forming and image transferring operations, the photosensitive member is rotated in a clockwise direction so that it is developed with toner by the developing device 12 and then reaches the transfer roller 10. The paired regist rollers 4a, 4b are rotated in such a sequence that the toner image formed on the photosensitive member is transferred onto the recording sheet at a predetermined position. After the toner image on the photosensitive member is transferred onto the recording sheet by the transfer roller 10, the recording sheet is sent up to the pair of fixing rollers 6a, 6b by the driving force of the paired regist rollers 4a, 4b. On the other hand, the toner remaining on the photosensitive member is cleaned by the cleaning device 11c.

Figure 7:
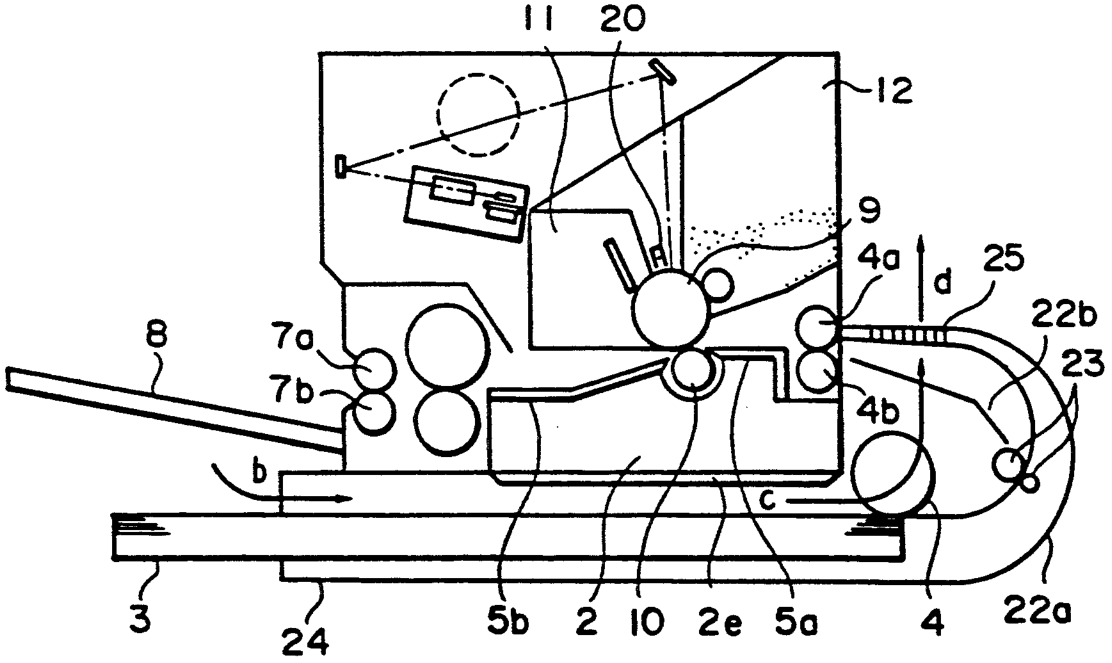
FIG. 7 is a sectional view similar to FIG. 6, but showing a flow of an air stream.

Next, an air stream flowing within the sheet supply unit 24 will be explained with reference to FIG. 7. Now, the same structural elements as those shown in FIG. 6 are designated by the same reference numerals and the explanation thereof will be omitted.

A part of the air stream heated by the heat generated by the electric power source portion 2 flows upwardly to heat the recording sheet feeding guides 5a, 5b positioned on the top of the electric power source portion 2. On the other hand, the remaining hot air stream is directed to the lower radiating plate 2e to heat the latter. The radiating plate 2e faces the sheet supply unit 24 containing the recording sheets, and the unit is enclosed by an armor cover. The cover has a plurality of air apertures 25 near the paired regist rollers 4a, 4b, through which the hot air is discharged.

The hot air stream heated by the electric power source portion 2 flows into the sheet supply unit 24 to increase the temperature of the air in the unit, with the result that the humidity around the recording sheets is relatively decreased, thus eliminating the bad influence due to the high humidity, such as poor image transfer. Further, the heat in the sheet supply unit 24 is entrained by the air stream generated when the recording sheet 3 is conveyed and by the air stream flowing into the unit in a direction b due to the natural convection and is conveyed upwardly as shown by the arrow c, and then is discharged in a direction d through the air apertures 25.

Figure 8:
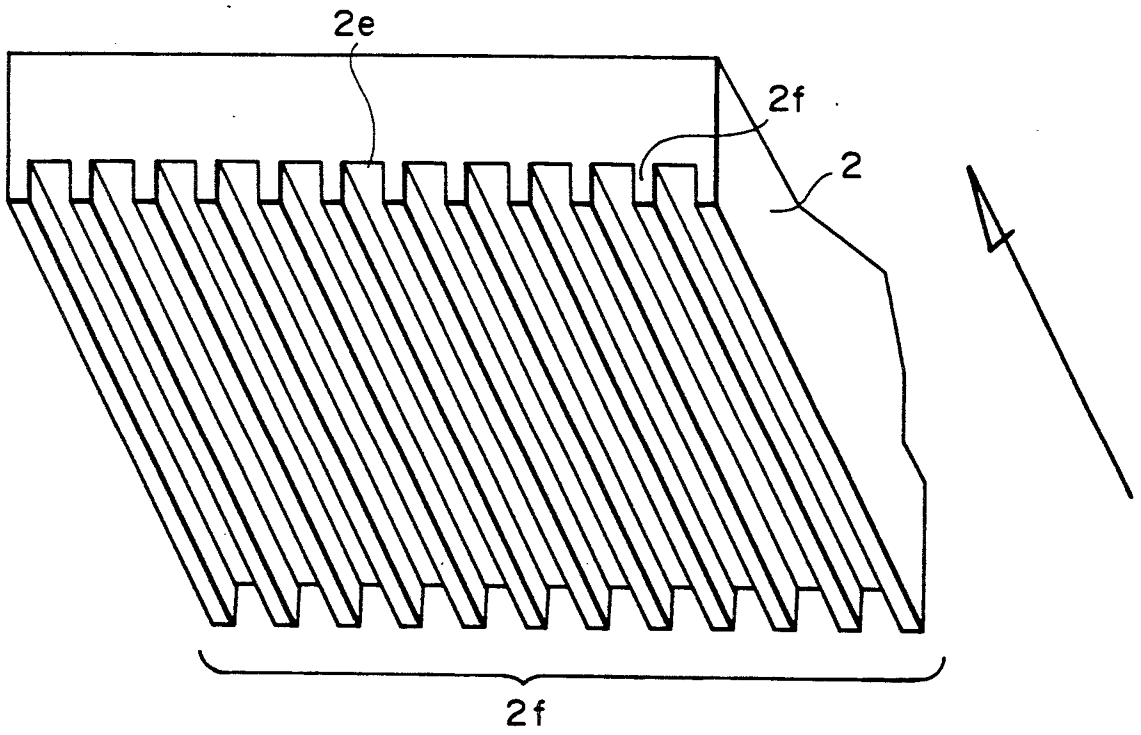
FIG. 8 is a perspective view of radiating fins.

FIG. 8 shows the radiating plate 2e arranged on the electric power source portion 2. Radiating fins 2f extend along a recording sheet feeding direction so that the air stream generated when the recording sheet is advanced can flow on the radiating fins without obstruction.

As mentioned above, according to the embodiment shown in FIG. 6, since the radiating plate of the electric part such as the electric power source portion disposed near the image forming portion is arranged in confronting relation to the recording sheet containing portion, the heated air stream generated by the electric part can be utilized as a heating means for heating the recording sheets and therearound, with the result that the image forming apparatus is almost not influenced upon the temperature in the low temperature or high humidity condition, thus not only maintaining the stable image forming ability but also realizing the power source unit having good radiating efficiency, thereby providing the compact image forming apparatus.

Figure 9:
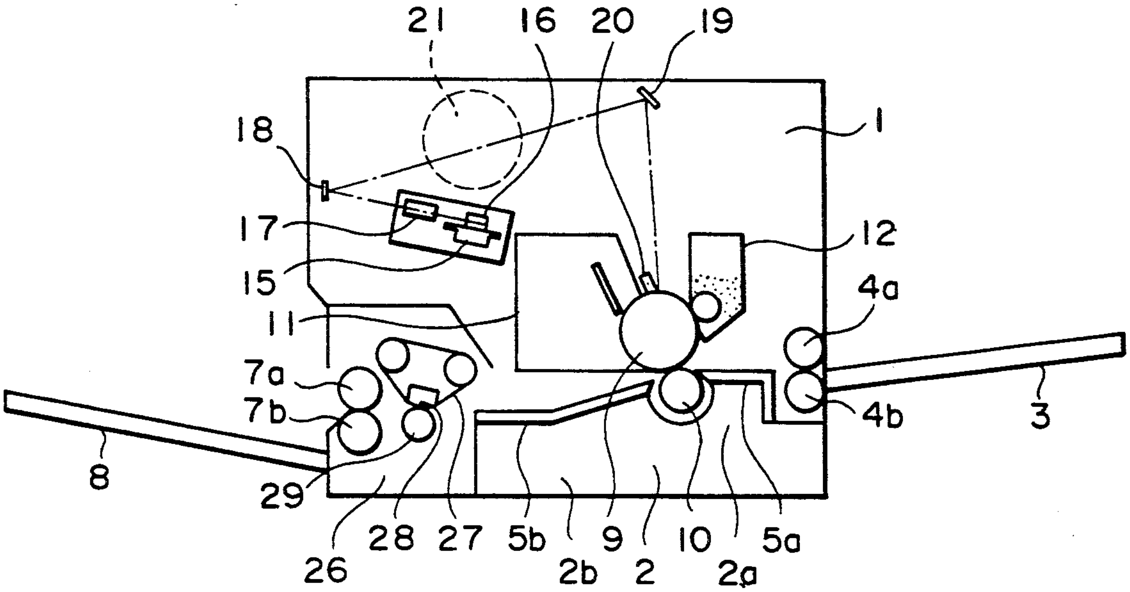
FIGS. 9, 11 and 12 are elevational sectional views of image forming apparatuses according to other embodiments of the present invention.

According to a further embodiment shown in FIG. 9, a new fixing device 26 is used in place of the fixing rollers 6a, 6b. The fixing device 26 comprises an endless film 27, a heating element 28 and a pressure roller 29 acting as a pressure rotary member for urging the film 27 against the heating element.

Figure 10:
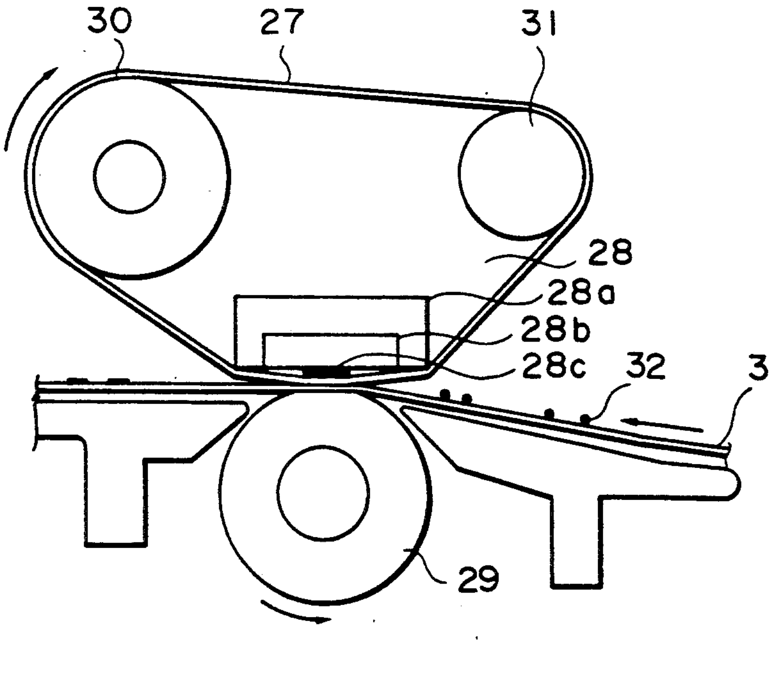
FIG. 10 is an enlarged sectional view of a fixing device of the image forming apparatus of FIG. 9.

FIG. 10 is an enlarged sectional view of the fixing device 26 of FIG. 9.

In FIG. 10, the heating element 28 is fixed with respect to the fixing device at least during the fixing operation, and comprises an alumina substrate 28b having a thickness of 1.0 mm, width of 10 mm and longitudinal length of 240 mm, for example, a holder 28a for supporting the alumina substrate 28b, and a layer 28c of an exothermic resistance material coated on the alumina substrate with a width of 1.0 mm. Electric power in the form of pulse waves of DC 100 V and having duration of 20 msec is applied to the heating element 28 from the longitudinal ends thereof. Now, it is so selected that the temperature of the toner at a separating point where the recording sheet 3 is separated from the film 27 is larger than the glass transition point, and, preferably, the toner temperature is larger than the toner softening temperature (ring and ball method).

In this way, the endless fixing film 27 is shifted in a direction shown by the arrow in FIG. 10 while slidingly contacting with the heating element 28, under the temperature and energy control As an example, the fixing film 27 may comprise a heat resistive film having a thickness of 20 $\mu$m, such as an endless belt made of polyamide or polyetherimide material. Generally, total thickness of the film may be less than 100 $\mu$m, more preferably, less than 40 $\mu$m. The fixing film 27 is supported and tensioned by a driving roller 30 for driving the film 27 and a driven roller 31 driven in response to the movement of the film. The film can be shifted in the direction shown by the arrow without shrinking, due to the driving force and tension force.

The pressure roller 29 has an elastic rubber layer having good separating feature such as a silicon rubber layer, and pressurizes the linear heating element 28 having low heat capacity with the interposition of the fixing film 27 with the total pressure of 47 Kg to rotate while pressure-contacting with the fixing film 27.

Non-fixed toner image 32 on the recording sheet is directed to the fixing portion constituted by a nip (contacting area) between the film and the pressure roller 29 through an inlet guide. The recording sheet 3 is pressurized between the heating element 28 and the film 27 in the nip area by means of the pressure roller 29, with the result that the surface of the recording sheet on which the toner image is carried contacts the film 27, thus fixing the toner image on the sheet by the heat.

Since, in this fixing device, the toner image is fixed with the heat and pressure from the linear heating element 28, particularly, in the cold weather, if the recording sheet is pre-heated, the fixing efficiency is promoted. Of course, such fixing device is useful also in the image forming apparatus having the electric power source portion as shown in FIG. 6.

Figure 11:
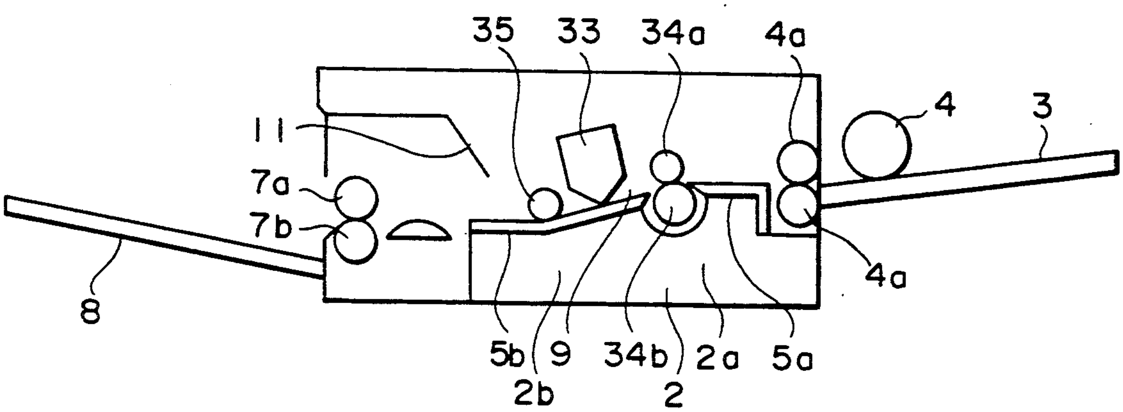

In a still further embodiment shown in FIG. 11, in place of the electrophotographic process, a recording head 33 of an ink jet type is applied in the image forming portion. In this case, the electric power source portion 2 includes heat generating sources such as a power transistor, transformer and the like for driving the apparatus. The recording sheet 3 is sent to the head 33 by means of the regist rollers 4*a*, 4*b* and feed rollers 34*a*, 34*b*. The recording sheet 3 on which the image is formed by the head 33 is ejected out of the apparatus by means of a hold-down and feed roller 35.

In this embodiment, since the toner image formed on the recording sheet by the ink jet process can be adequately driven on the feeding guide 5*b*, if a new recording sheet is overlapped to the previous recording sheet in the ejector tray 8, the back surface of the new recording sheet is not smeared with ink.

Figure 12:
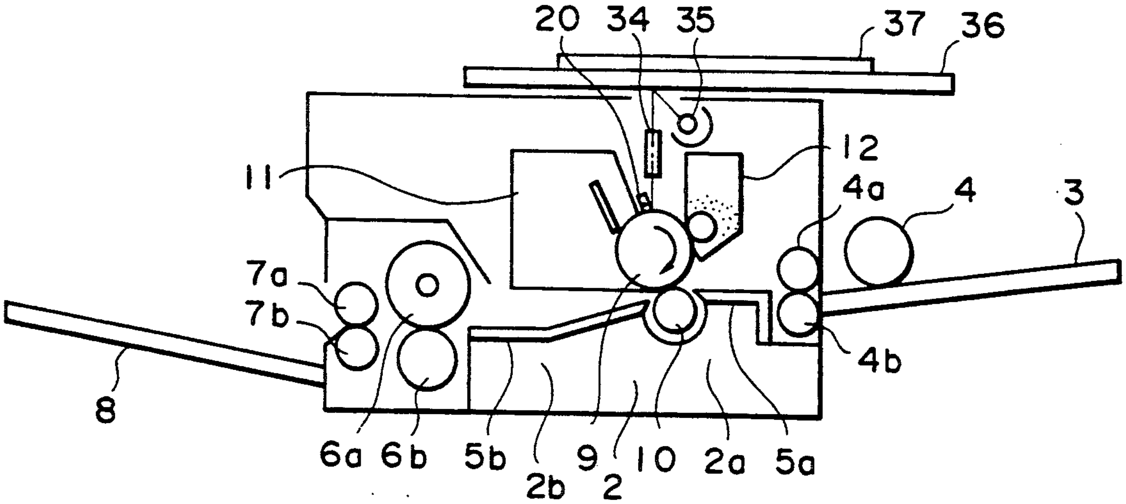

In the illustrated embodiments, while the image forming apparatus was explained as the recording apparatus such as a printer, the present invention is effectively applicable to conventional electrophotographic copying machines. FIG. 12 shows an example of such copying machine to which the present invention is applied, wherein an original 37 rested on an original support glass plate 36 is illuminated by light from a lamp 35, and a light image obtained is focused on the photosensitive member 9 by means of a short-focus lens array 34. In this example, while the original support glass plate 36 was movable, the glass plate 36 may be stationary and a conventional optical scanning system may be movable.

As mentioned above, according to the present invention, since the heat generated by the electric part is absorbed or eliminated by the recording sheet itself or by the air stream created by the movement of the recording sheet, the electric part can be arranged in the space along the recording sheet feeding path. Consequently, the strong blower mechanism is not required and it is not needed to install the electric part at a specific position forcibly, thus permitting the effective use of the space in the apparatus. Further, since the recording sheet is pre-heated, the fixing energy can be reduced and the stable transferring effect can be obtained.

Further, the electric part is not limited to the electric power source portion, but may include a controlling semi-conductor electric circuit such as an IC, LSI and the like.

I claim:

1. An image forming apparatus comprising:
   - a recording sheet containing portion for containing recording sheets;
   - an image forming portion for forming an image on the recording sheet;
   - a recording sheet conveying means for supplying the recording sheet to said image forming portion; and
   - a recording sheet guiding portion disposed near an electric circuit portion for said image forming apparatus, said guiding portion having radiating ability for radiating the heat generated by said electric circuit portion by which the recording sheet passes while contacting therewith.

2. An image forming apparatus according to claim 1, wherein said recording sheet guiding portion has a fin-shaped configuration.

3. An image forming apparatus according to claim 2, wherein said recording sheet guiding portion has fins extending along a recording sheet feeding direction.

4. An image forming apparatus comprising:
   - a recording sheet containing portion for containing recording sheets;
   - an image forming portion for forming an image on the recording sheet;
   - a recording sheet conveying means for supplying the recording sheet to said image forming portion;
   - a recording sheet guiding portion disposed near an electric circuit portion for said image forming apparatus, said guiding portion having radiating ability for radiating the heat generated by said electric circuit portion by which the recording sheet passes while contacting therewith; wherein said electric circuit portion includes a radiating portion confronting but not contacting the recording sheets in said recording sheet containing portion.

5. An image forming apparatus according to claim 4, wherein said recording sheet guiding portion and said radiating portion each has a fin-shaped configuration.

6. An image forming apparatus according to claim 5, wherein said recording sheet guiding portion and said radiating portion each has fins extending along a recording sheet feeding direction.

7. An image forming apparatus comprising:
   - a recording medium containing portion for containing sheet-shaped recording media;
   - an image forming portion for forming a toner image on the recording medium, and comprising an electrophotographic photosensitive member, a latent image forming means and a developing means with toner;
   - a recording medium conveying means for supplying the recording medium to an image transferring portion of said image forming portion to transfer a toner image formed on said photosensitive member onto the recording medium; and
   - a recording medium guiding portion disposed near an electric circuit portion for said image forming apparatus, said guiding portion having radiating ability for radiating the heat generated by said electric circuit portion by which the recording medium passes while contacting therewith.

8. An image forming apparatus according to claim 7, wherein said recording medium guiding portion is disposed below said image forming portion and has a fin-shaped configuration.

9. An image forming apparatus according to claim 8, wherein said recording medium guiding portion is disposed below said image forming portion and has fins extending along a recording medium feeding direction.

10. An image forming apparatus comprising:

a recording medium containing portion for containing sheet-shaped recording media;

an image forming portion for forming a toner image on the recording medium and comprising an electrophotographic photosensitive member, a latent image forming means and a developing means with toner;

a recording medium conveying means for supplying the recording medium to an image transferring portion of said image forming portion to transfer a toner image formed on said photosensitive member onto the recording medium;

a recording medium guiding portion disposed near an electric circuit portion for said image forming apparatus, said guiding portion having radiating ability for radiating the heat generated by said electric circuit portion by which the recording medium passes while contacting therewith; wherein said electric circuit portion includes a radiating portion confronting but not contacting the recording medium in said recording medium containing portion.

11. An image forming apparatus according to claim 10, wherein said recording medium guiding portion is disposed below said image forming portion and has a fin-shaped configuration.

12. An image forming apparatus according to claim 11, wherein said recording medium guiding portion is disposed below said image forming portion and has fins extending along a recording medium feeding direction.

13. An image forming apparatus comprising:

a recording medium containing portion for containing sheet-shaped recording media;

an image forming portion for forming a toner image on the recording medium and comprising an electrophotographic photosensitive member, a latent image forming means, a developing means with toner and a cleaning means disposed at a downstream side of said photosensitive member and adapted to remove toner remaining on said photosensitive member after a transferring process has been finished;

a recording medium conveying means for supplying the recording medium to an image transferring portion of said image forming portion to transfer the toner image formed on said photosensitive member onto the recording medium;

a recording medium guiding portion disposed near an electric circuit portion for said image forming apparatus, said guiding portion having radiating ability for radiating the heat generated by said electric circuit portion by which the recording medium passes while contacting therewith; and an electrode member for transferring the toner image onto the recording medium.

14. An image forming apparatus according to claim 13, wherein said electrode member comprises a roller.

15. An image forming apparatus comprising:

a recording medium containing portion for containing sheet-shaped recording media;

an image forming portion for forming a toner image on the recording medium and comprising an electrophotographic photosensitive member, a latent image forming means, a developing means with toner and a cleaning means disposed at a downstream side of said photosensitive member and adapted to remove toner remaining on said photosensitive member after a transferring process has been finished;

a recording medium conveying means for supplying the recording medium to an image transferring portion of said image forming portion to transfer a toner image formed on said photosensitive member onto the recording medium;

a recording medium guiding portion disposed near an electric circuit portion for said image forming apparatus, said guiding portion having radiating ability for radiating the heat generated by said electric circuit portion through which the recording medium passes while contacting therewith;

an electrode member contacting with the recording medium for transferring the toner image onto the recording medium; and a heating element disposed i confronting relation to a film member for fixing the toner image on the recording medium.

16. An image forming apparatus according to claim 15, wherein said electrode member comprises a roller.

17. An image forming apparatus comprising:

a recording medium containing portion for containing sheet-shaped recording media;

an image forming portion for forming a toner image on the recording medium and comprising an electrophotographic photosensitive member, a latent image forming means, a developing means with toner and a cleaning means disposed at a downstream side of said photosensitive member and adapted to remove toner remaining on said photosensitive member after a transferring process has been finished;

a recording medium conveying means for supplying the recording medium to an image transferring portion of said image forming portion to transfer a toner image formed on said photosensitive member onto the recording medium; and a recording medium guiding portion disposed near an electric circuit portion arranged near said transferring portion, said electric circuit portion including a portion having a high calorific value positioned toward said cleaning means with respect to said transferring portion, said guiding portion having radiating ability for radiating the heat generated by said electric circuit portion by which the recording medium passes while contacting therewith.

18. An image forming apparatus according to claim 17, wherein said recording medium guiding portion has a fin-shaped configuration.

19. An image forming apparatus according to claim 18, wherein said recording medium guiding portion has fins extending along a recording medium feeding direction.

20. An image forming apparatus comprising:

a recording sheet containing portion for containing recording sheets;

an image forming portion for forming an image on the recording sheet;

a recording sheet conveying means for supplying the recording sheet to said image forming portion; and a radiating portion of an electric circuit portion for said image forming apparatus, said radiating portion arranged in a confronting but non-contacting relation to the recording sheets in said recording sheet containing portion.

21. An image forming apparatus according to claim 20, wherein said radiating portion has a fin-shaped configuration.

22. An image forming apparatus according to claim 21, wherein said radiating portion has fins extending along a recording medium feeding direction.

* * * * *

UNITED STATES PATENT AND TRADEMARK OFFICE

CERTIFICATE OF CORRECTION

PATENT NO. : 5,136,329 Page 1 of 3

DATED : August 4, 1992

INVENTOR(S) : Yoshinori SUGIURA

It is certified that error appears in the above-indentified patent and that said Letters Patent is hereby corrected as shown below:

On title page,

AT [30] FOREIGN PATENT PRIORITY DATA:

"Dec. 21, 1989 [JP] Japan..................1-14849" should read:

--Dec. 21, 1989 [JP] Japan.........1-148492[U];--; and "Dec. 29, 1989 [JP] Japan..............1-343109[U]" should read:

--Dec. 29, 1989 [JP] Japan.............1-343109--.

COLUMN 1:

Line 36, "improvement" should read --improvement,--;

Line 55, "average" should read --arrange--.

COLUMN 2:

Line 12, "regarding" should read --for--.

COLUMN 3:

Line 10, "temporally" should read --temporarily--.

UNITED STATES PATENT AND TRADEMARK OFFICE

CERTIFICATE OF CORRECTION

PATENT NO. : 5,136,329

DATED : August 4, 1992

INVENTOR(S) : Yoshinori SUGIURA

It is certified that error appears in the above-indentified patent and that said Letters Patent is hereby corrected as shown below:

COLUMN 4:

Line 12, "aluminium" should read --aluminum--;

Line 34, "aluminium" should read --aluminum--.

COLUMN 5:

Line 55, "cleaning device 11c." should read --cleaning device 11.--.

COLUMN 7:

Line 13, "recording sheet" should read --recording sheet 3--.

COLUMN 8:

Line 5, "semi-conductor" should read --semiconductor--.

UNITED STATES PATENT AND TRADEMARK OFFICE

CERTIFICATE OF CORRECTION

PATENT NO. : 5,136,329

DATED : August 4, 1992

INVENTOR(S) : Yoshinori SUGIURA

It is certified that error appears in the above-indentified patent and that said Letters Patent is hereby corrected as shown below:

COLUMN 10:

Line 24, "i" should read --in--.

Signed and Sealed this

Nineteenth Day of August, 1997

Attest:

Bruce Lehman

BRUCE LEHMAN

*Attesting Officer*

*Commissioner of Patents and Trademarks*